United States Patent [19]
Dillon

[11] Patent Number: 6,020,892
[45] Date of Patent: Feb. 1, 2000

[54] PROCESS FOR PRODUCING AND CONTROLLING ANIMATED FACIAL REPRESENTATIONS

[76] Inventor: Kelly Dillon, 15901 S. E. 3rd, Bellevue, Wash. 98008

[21] Appl. No.: 08/939,387

[22] Filed: Sep. 29, 1997

Related U.S. Application Data

[63] Continuation-in-part of application No. 08/423,926, Apr. 17, 1995, abandoned.

[51] Int. Cl.$^7$ .............................. G06T 15/70; G06F 15/00
[52] U.S. Cl. ............................................. 345/419; 345/429
[58] Field of Search ..................................... 345/419, 429, 345/428, 116, 473, 132, 136, 133, 127, 121

[56] References Cited

U.S. PATENT DOCUMENTS

| | | | |
|---|---|---|---|
| 4,827,532 | 5/1989 | Bloomstein | 382/41 |
| 5,009,626 | 4/1991 | Katz | 446/391 |
| 5,111,409 | 5/1992 | Gasper et al. | 345/302 |
| 5,148,477 | 9/1992 | Neely et al. | 382/107 |
| 5,450,504 | 9/1995 | Calia | 382/118 |
| 5,479,529 | 12/1995 | Nakegawa et al. | 382/118 |
| 5,500,671 | 3/1996 | Anderson et al. | 348/15 |
| 5,774,591 | 6/1936 | Black et al. | 382/236 |
| 5,802,220 | 9/1998 | Black et al. | 382/276 |
| 5,850,463 | 12/1998 | Horii | 382/118 |

OTHER PUBLICATIONS

Singh et al., Control and Coordination of Head, Eyes and Facial Expressions of Virtual Actors in Virtual Envirnoments, Robot and Human Communication, pp. 335–339, Nov. 1993.

Beier et al., Feature–Based Image Metamorphosis, Computer Graphics, pp. 35–42, Jul. 1992.

Wang et al., Langwidere: A New Facial Animation System, pp. 59–68, Sep. 1994.

Caudell et al., Neural Modeling of Face Animation for Telecommuting in Virtual Reality, Boeing computer Services, pp. 478–485, Sep. 1993.

Essa et al., Tracking Facial Motion, IEEE Computer Soc. Press, pp. 36–42, Nov. 1994.

Lee et al., Realistic Modeling for Facial Animation, Computer Graphics Proceedings, pp. 55–63, Aug. 1995.

*Primary Examiner*—Stephen S. Hong
*Assistant Examiner*—Alford W. Kindred
*Attorney, Agent, or Firm*—Robert W. Jenny

[57] ABSTRACT

A process for real-time motion control of ultra-high quality animated faces of any kind (human, dog, fish, etc.), or control of robotic faces. The system uses common motion capture equipment to develop high and low resolution data sets of facial expressions for human actor faces (serving as the input devices). The high-resolution data is manually and semi-automatically enhanced to provide additional information pertaining to any given expression. The high-resolution expression data sets are logically linked to robotic and computer model faces of any shape for discrete control of all robotic motion controls and the creation of a high resolution data set of model expressions. Real-time low-resolution motion capture data is matched to the low-resolution data sets, and thereby matched to the enhanced high resolution model data sets. Real-time model motion and robotic motion is thus effected by the real time motion capture, though the motion is made more real and fluid by the additional pre-processed information provided in the high resolution index.

3 Claims, 3 Drawing Sheets

PROCESS FOR PRODUCING AND CONTROLLING ANIMATED FACIAL REPRESENTATIONS

This application is a Continuation-In-Part application based on application Ser. No. 08/423,926 filed Apr. 17, 1995 to be abandoned when the subject application is duly filed.

BACKGROUND OF THE INVENTION

1. Field

The subject invention is in the field of electronic processes which involve both hardware and software. Specifically, it is in the field of such processes related to production and control of facial representations such as on photographer's film, computer driven cathode ray tubes or computer driven robotic faces. More specifically, it is in the field of such processes based on real time electronic capture and representation of motions of all portions of human faces.

2. Prior Art

The documents listed below are a sampling of prior art related to computer generated and/or controlled animated representations of human faces, some operating in real time.

U.S. Patent Documents:

| | | |
|---|---|---|
| 5,500,671 | 3/19/96 | Andersson et al. |
| 5,479,529 | 12/26/95 | Nakagawa et al. |
| 5,347,306 | 9/13/94 | Nitta |
| 5,009,626 | 4/23/91 | Katz |
| 4,827,532 | 5/2/89 | Bloomstein |
| 5,129,014 | 7/7/92 | Bloomberg |

Non-Patent Documents:

Terzopoulos et al., Analysis and Synthesis of Facial Image Sequences Using Physical and Anatomical Models, IEEE Transactions on Pattern Analysis, v. 14, n. 6, June 1993, p. 569–579.

Ohya et al., Real-Time Reproduction of 3D Human Images in Virtual Space Teleconferencing, IEEE Virtual Reality Annual Symposium, Sep. 22, 1993, p. 408–414.

Choi et al., Analysis and Synthesis of Facial Image Sequences in Model Based Image Coding, IEEE Transactions on Circuits and Systems for Video Technology, June 1994,p. 257–275.

Singh et al., Control and Coordination of Head, Eyes and Facial Expressions of Virtual Actors in Virtual Environments, IEEE Robot and Human Communication, 1993 Int'l Workshop, 11/93, p. 335–339.

Several techniques are shown for (1) detecting and recording the motions and deflections of portions of a human face in real time as expressions are generated and changing and (2) processing and using the recorded information to produce facial images showing the recorded expressions or to drive the actuation of a robotic face model, of a human face or not. However, it is known that there is demand for techniques for the purposes described which provide even more life-like representations and are less costly to use, partly because less time and effort are involved in producing better quality results.

Limitations of prior art systems for detecting and recording (capturing) the motions, deflections and related characteristics of a human face are: (1) the equipment and techniques do not provide enough detail for producing discrete realistic expressions in the representations; (2) available computers have not been able to allow prior art systems to work at a real-time standard rate of 15 to 30 frames per second; (3) the captured human facial input does not properly create or control faces which are significantly different from the face from which the input data was captured such as, in particular non-human faces; (4) facial features such as wrinkles and skin stretching and sliding across a face have not been managed to a high enough degree of quality and detail; and (5) the facial input has not been sufficiently successfully transmuted to the output representation.

Accordingly, the primary objective of the subject invention is to provide a process using known facial expression capture techniques and overcoming the stated limitations. Further objectives are that the process accommodate any face for input purposes in real time function and produce fluidly animated representations of humans and non-humans with detail sufficient to show subtle changes in appearances such as glowers and scowls. A further objective is that the subject process produce significantly superior products at significantly less cost.

SUMMARY OF THE INVENTION

For the purposes of this disclosure the following definitions are used.

Definitions:

High Resolution Index Face: Data captured from a human face using a high-resolution position capture system, the data being embellished with information pertaining to the expression.

High Resolution Index Neutral Face: A high Resolution Index Face captured from a face with a neutral expression.

High Resolution Capture System: A system comprised of hardware and software to calculate and track and record three-dimensional locations of specific points on the face, and calculate the surface of the face in three dimensions.

Computer Model Face: A face represented in a geometric form via computer.

Computer Model Neutral Face: A face with a neutral expression represented in a geometric form via computer.

Robotic Face: An artificial material face controlled by motion devices which are part of the face or are attached to various points behind the face.

High Density Markers: Reflective or luminous markers which are attached to a face being captured in close proximity to each other such that all motions of the face are effectively represented by the markers. The number of markers can range from 50 to 900.

High Resolution Index: A collection of recordings of facial expressions in which the information related to each expression includes detailed geometric position information of specific markers on the face, general three-dimensional coordinate mapping, and information pertaining to eyes, lips, wrinkles, hair, and texture.

Low Resolution Index: A collection of recordings of facial expressions in which the information related to each expression is limited to identifying the uniqueness of numerous segments of the face for any given expression, and the similarity of each expression to other expressions.

Low Resolution Motion Capture: Any type of facial motion detection and recording system capable of capturing and determining unique and measurable values related to unique configurations of subsections of the face.

Model Nodes: Identifiers placed on a computer Model Face for correlating the motions of the Computer Model Face to motions of a High Resolution Index human face.

The subject invention is a process which uses facial motion capture apparatus to provide an overall motion capture system capable of delivering higher quality moving facial representations at less production cost. The system may use proprietary and/or existing) motion capture systems for capturing both high and low resolution data pertaining to a variety of facial expressions. Using such apparatus, the following process steps are employed. FIG. 1 also outlines this process.

Set up the High Resolution Index: This section of the subject system is intended for use primarily with human faces. High Density Markers are placed on a face and, using equipment for processing three dimensional shape data and a digital camera, a wide variety of facial expressions are captured. These expressions are then processed for three dimensional positions of the markers and the three dimensional shape of the face overall. This High Resolution Index comprises the full range of facial expressions for any segment of the face. The Index will serve as the hub or interface for all further capture of human face data and all facial representation animation including robotic faces.

The High Resolution Index is further "cleaned" of any bad or missing geometric data and each expression is geometrically positioned so that all expressions are in the same location and orientation in space. Additional information pertaining to each expression is added manually or semi-automatically. Such information may include information which may change for each expression, such as skin tone and texture, wrinkle information, face hair normals, eyelid information, etc.

Associate Talents to the High Resolution Index: Talents (actors who will act out model roles in real-time) are then linked to the High Resolution Index by setting up the talent for Low Resolution Motion Capture and then capturing expressions which match the High Resolution Index expressions. Motion capture devices typical to the industry are employed in this process. The Low Resolution Index information is further broken down into facial segments and each segment is geometrically positioned so that all segment expressions are in the same location and orientation in space.

Link Computer Model Faces to the High Resolution Index: Computer model faces are also linked to the High Resolution Index by associating a model neutral face to the motion points on the High Resolution Index Neutral face. This is done using graphical tools typically embedded in animation or CAD system software. The associations include the placement of "nodes" on the model which identify a driving marker (or markers) on the High Resolution Index face. This association includes geometric association which may be (1) unique for any direction of motion, (2) non-linear with respect to both direction of travel and magnitude of travel, and (3) include additional non-geometric relationships such as texture and color correlations to such information as found in the High Resolution Index.

Pre-process a High Resolution Model Index: With the above steps completed, Low Resolution Motion Capture system may be used again with a talent to capture facial motion in real-time. The talent's real-time motion frames are then processed in the same manner as those in the Low Resolution Index setup such that facial segments in the real-time motion frames can be logically matched to the similar expressions in the Low Resolution Index. By cross reference, the High Resolution Model Index of expressions can be accessed on a per-segment basis to create a completely unique "real-time" facial expression comprised of weighted averaging of several High Resolution Model faces for each facial segment. Given that the High Resolution Model Index can contain vast amounts of "clean" geometric data, plus information beyond geometric data, the Model face in real-time can contain more information, and have better, more thorough animation than is possible using a conventional real-time motion capture system. Also, additional cameras or other input devices may complement the motion capture system in order to gather further detail of specific facial elements, such as the eyes or the lips. This additional data is processed and passed into the real-time model data.

Animate Real-Time Motion: The real-time model motion data can then be used in an animation software system. This is typically achieved by adding a custom software tool to the animation system. Such tools are often generically called plug-ins. The plug-in is a form of modification tool which is applied to the neutral model face which has been prepared for real-time motion. The plug-in retrieves real-time motion data for any given time period of the animation and moves the vertices of the model accordingly. If any other motion data has been included in the real-time data, such as eye rotation, skin tone, etc., the plug-in also modifies that data as well.

Move Robitic Faces: Robotic face control is facilitated by associating the servo or other motion control systems connected to or part of the robotic face to the motions of points in a Model. Thus motion of a robotic face is directed via the motion of a model. Specific servo control is attained by the translation of the output node motion into servo or other motion control system commands.

BRIEF DESCRIPTIONS OF DRAWINGS

DETAILED DESCRIPTION OF THE INVENTION

Figure 1:
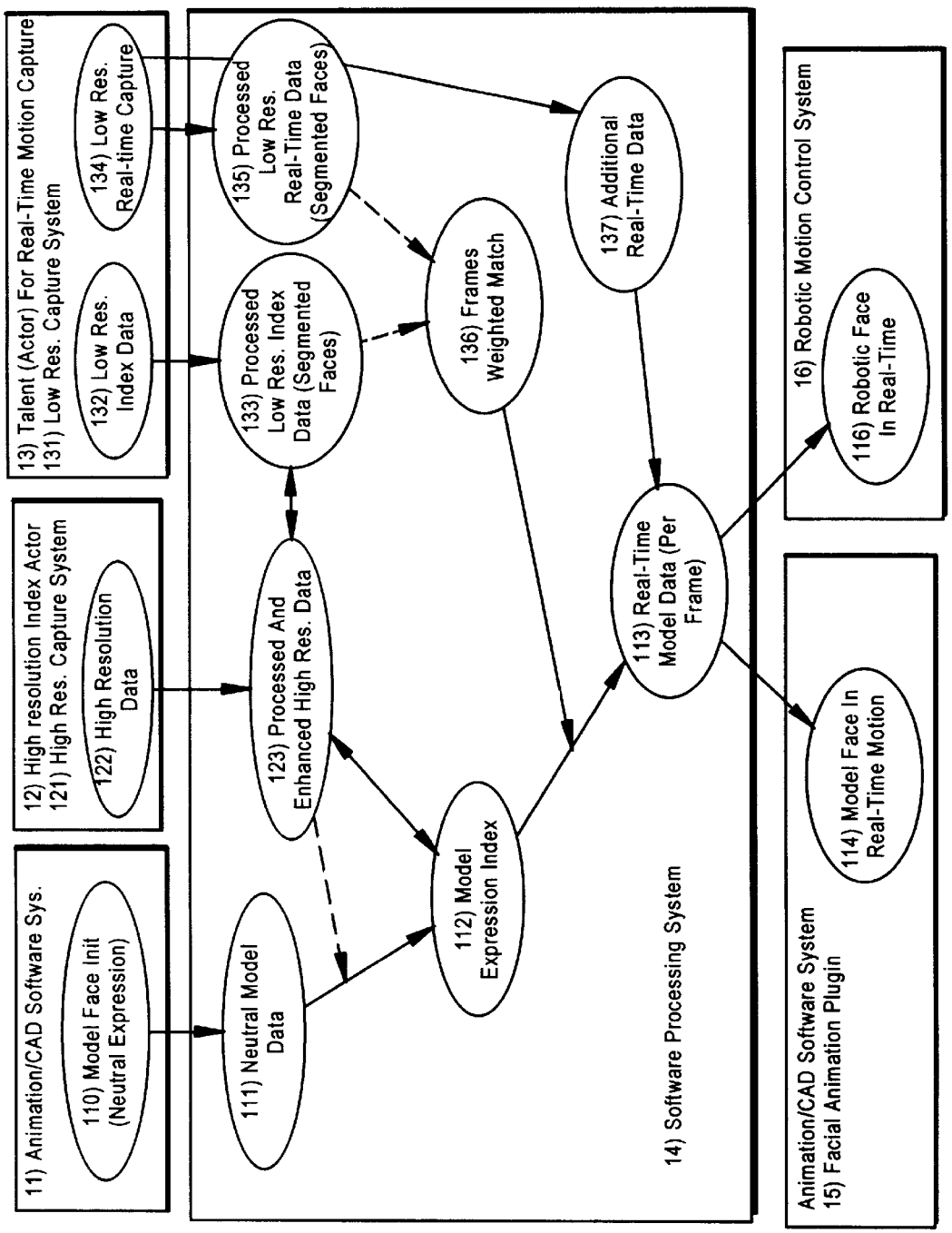
FIG. 1 is a flowchart illustrating the overall Data Flow and tools of the system.
Figure 2:
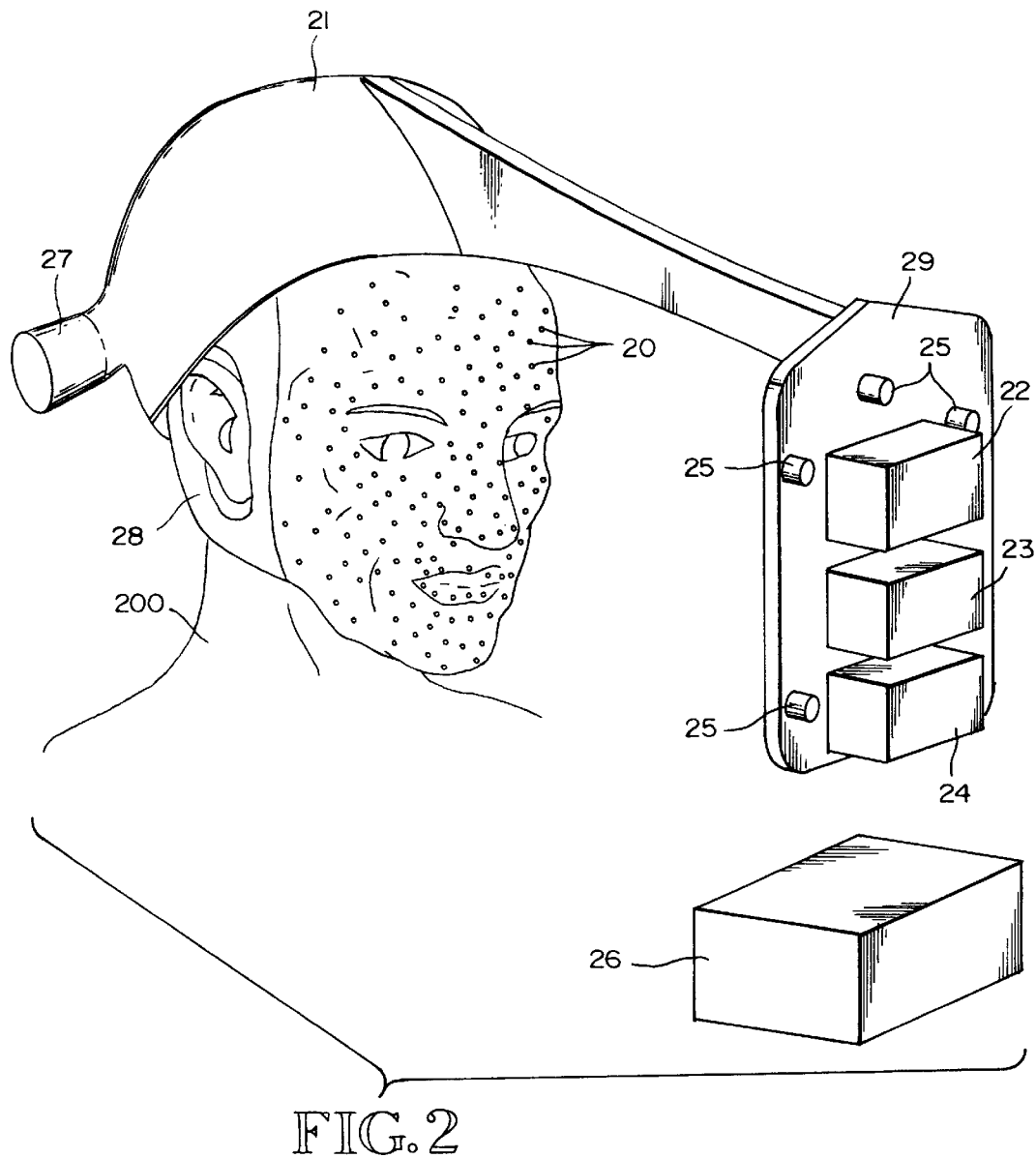
FIG. 2 is an isometric view of a typical real-time motion capture device for digital motion capture of the face.

The Subject invention is a process for producing and controlling animated facial representations in real time. The process, as described in the Summary of the Invention in this application, uses various tools common to the industry of motion capture. FIG. 2 displays a human actor 200 (also referenced by 12) using a common type of a digital camera based motion capture system. The actor's face is marked with retro-reflective markers, marker 20 being typical, and illuminated by lighting 25 so that the motion of the specific markers can be resolved in three dimensions by processing the images captured by the two digital cameras 22 and 24. The cameras are held in place relative to the face by helmet apparatus 21 consisting of camera mount 29, counterweight 27 and strap 28.

High resolution index data 122 is created using system 21 where the markers 20 are dense in number and relatively small—numbering typically between 75 to 400 points. Optionally, additional three-dimensional information may be gathered by using one or more tools common to three-dimensional data capture. Common systems for capturing 3d data include rotoscopes (not shown) and differential light edge detection systems (not shown). Using this system, a wide variety of facial expressions are captured and stored in computer system 26 for further post-session processing.

Using a computer program with a graphical user interface 14, the captured data is then processed to locate the three-dimensional points for each expression. The high resolution index data is "cleaned" of any bad or missing geometric data and each expression is geometrically automatically positioned so that all expressions are in the same location and orientation in space. Additional information pertaining to each expression is added manually or semi-automatically by means of a software interface. Such information may include information which may change for each expression, such as skin tone and texture, wrinkle information, face hair normals, eyelid information, etc. The processed and enhanced data comprises the High Resolution Index 123.

Using the system in FIG. 2, talent(s) 13 are then linked to the High Resolution Index by placing on a talent a lower density of markers 20, which markers are larger in size for ease of processing and typically number between 30 to 60 points. The Talent compiles, low resolution Index data 132 by making and capturing expressions which match the High Resolution Index expressions. The information is then processed into three-dimensional points and then further broken down into facial segments, and each segment is geometrically positioned so that all segment expressions are in the same location and orientation in space. This information comprises the Low Resolution Index 133—specific for any given talent.

Figure 3:
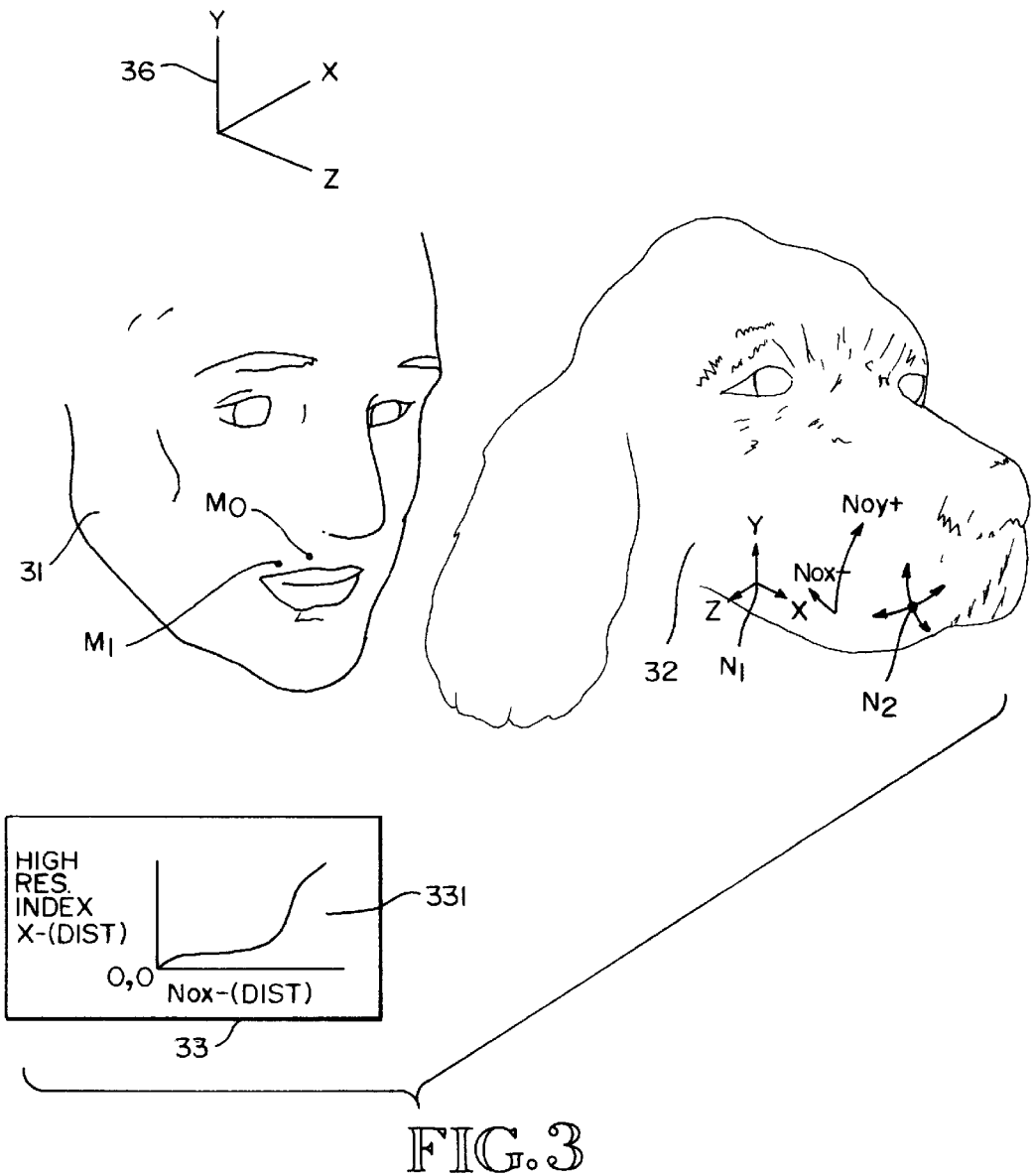
FIG. 3 illustrates isometric outlines of a human High Resolution Index Neutral Face, and a Computer Model Neutral Face, for illustrating node points, motion vectors, wrinkles and the correlation thereof.

FIG. 3 displays a High Resolution Index Neutral Face 31 (also referenced by 110) and a Computer Model Neutral Face 32 (found in the High Resolution Index) which are being linked by means of markers $M_n$ and $N_n$. The Markers $M_0$ and $M_1$ represent individual High Density Markers 20. The reference motions of the markers are defined by motion axes 36. Nodes $N_0$, $N_1$ and $N_2$ represent a subset of nodes placed by an operator in an animation or CAD package which reference specific Markers. The relationship defined between Markers and Nodes defines the motion of the Nodes in relation to the motion of the Markers. While the Marker motion is a static xyz axis 36, the motion of $N_n$, is defined by either a rotatable and scaleable axis 37 where each axis in the positive and negative axis may be discretely scaled, or by a motion spline $N_{oy+}$ and $N_{ox-}$ where each axis of motion is defined by a spline along which the axis of motion travels. The magnitude of the motion may be controlled by a percentage of the given marker motion, or may be controlled non-linearly in a manner such as seen in 33, where the operator may control the distance node $N_o$ travels along $N_{ox-}$ by adjusting curve 331.

Note that nodes are not on a one to one relationship with markers. More than one node may reference a single marker, and some markers need not be referenced at all. By careful placement of such nodes physical elements such as wrinkles, eyelid folds, upper and lower teeth, adam's apple, jaw motion and etc., can be effectively controlled with a high resolution.

With model association (via nodes) completed, data for all the vertices of a model face are processed to comprise Neutral Model Data 111. Using the Neutral Model Data the system can then generate a Model Index 112 of expressions which correspond to the High Resolution Index expressions. Each Model Index is specific for each model.

For real-time motion capture, talent 13 may again use the Low Resolution Capture System 21 to capture facial motion data 134 in real-time. The talent's real-time motion frames are then processed in the same manner as that in the Low Resolution Index setup to generate Processed real-time motion face segments 135. These processed segments are then logically matched to the similar expressions in the Low Resolution Index 133. By cross reference, the Model Index 112 of expressions can be accessed on a per-segment basis to create a completely unique "real-time" facial expression comprised of weighted averaging of several High Resolution Model faces for each facial segment. The result is real-time per frame model expression data 113. Given that the High Resolution Model Index can contain vast amounts of "clean" geometric data, plus information beyond geometric data, the Model face, in real-time can contain more information, and have better more thorough animation than is possible using a standard real-time motion capture system.

Additional cameras, such as 23 may be added to focus in on certain areas of the face such as the lips for additional processing capabilities which work in conjunction with the three dimensional data. This additional data 137 is passed into the real-time data for use by the facial animation plug-in 15.

Real-time model motion is then animated by implementing a custom animation system plug-in 15, which applies the real-time data to the model neutral face. The plug-in retrieves real-time motion data for any given time period of the animation and moves the vertices of the model accordingly. The plug-in also applies additional data 137 to the model face as required. Via the plug-in in the animation system the model face 114 thus becomes animated.

For robotic face control a robotic control system 16 retrieves the real-time motion data and moves the servos or other motion system per a motion translator custom to the given motion device, which moves the face in accordance with the motion of the model motion data.

It is considered to be understandable from this description that the subject invention meets its objectives primarily because facial expressions captured with economical, conventional, relatively low resolution are converted to much higher resolution animated representations by adding information from the High Resolution Index. Also, the High Resolution Index information is applicable to animation of faces which may be only vaguely similar to the input faces used to make up the High Resolution Index. In other words, the information in the High Resolution Index is permanently available for increasing the resolution of economically produceable low resolution images, the result being the desired high resolution animation at much less cost and in much less time than are currently required for results of the quality attained.

It is also considered to be understood that while certain embodiments of the subject invention are described herein, other embodiments and modifications of those described are possible within the scope of the invention which is limited only by the attached claims.

I claim:

1. A process for producing and controlling animation of Computer Model Faces and Robotic Faces, each of said Robotic Faces having a plurality of position controllers, said process being implemented with a High Resolution Capture System, a Low Resolution Motion Capture System, a plurality of High Density Markers, a plurality of actors, each having a face providing facial expressions including wrinkles, skin tone, lips and eyelids and Model Nodes, said process comprising the steps of:

A) preparing a High Resolution Index using
 (1) said High Resolution Capture System using said High Density Markers on said face of one of said actors, capturing high resolution information for a variety of High Resolution Index facial expressions, said High Resolution Index comprising said high resolution facial expressions including geometric information about each of said expressions, and (2) adding additional information to each of said high resolution expressions including information about said wrinkles, skin tone, lips and eyelids;

B) preparing a Low Resolution Index for each actor of said plurality of actors to associate each actor to said High Resolution Index by:
   (1) using said Low Resolution Tracking System with each actor of said plurality of actors to capture low resolution facial expressions equivalent to the high resolution expressions in the High Resolution Index, said Low Resolution Index comprising said low resolution expressions,
   (2) processing said Low Resolution Index expressions into facial segments and processing said segments to be identifiable as unique, and
   (3) linking said Low Resolution Index expressions to said High Resolution Index expressions by numerically associating them on a one-to-one basis;

C) preparing Computer Model Faces including a Computer Model Neutral Face, said Computer Model Faces each having a plurality of vertex points;

D) associating said Computer Model Faces to which Index by
   (1) placing said Model Nodes on said Computer Model Neutral Face,
   (2) defining the motions of said Model Nodes for correlation of motions of specific ones of said High Density Markers in said facial expressions in said High Resolution Index, said correlations including variation of motion direction and non-linearity in direction and magnitude of said motions;
   (3) logically constraining said Computer Model Face from undesired motion by controlling, including preventing, motions of said Model Nodes in certain directions, and
   (4) processing said vertex points of said Computer Model Face with respect to said Nodes on said face by identifying each of said vertex point's Model Nodes of influence;

E) creating a Model Index including Model Index expressions by
   (1) using said Computer Model Neutral Face, information for each of said expressions of said High Resolution Index and information of said association of said Computer Model Neutral Face to said High Resolution Index, processing a unique Computer Model Face correlating to each of said expressions in said High Resolution Index, said Model Index comprising said Computer Model Faces;
   (2) linking said expressions of said Model Index to said expressions of said High Resolution Index by numerically associating them on a one-to-one basis;

F) capturing and processing real time facial motion of one of said plurality of actors in low resolution to produce a shot, said shot comprising expressions in real time, or any time less than real time, said expressions being captured using said Low Resolution Tracking System, and (1) processing the real-time facial motion expressions in facial segments, each of said expressions having a unique low resolution signature,
(2) matching each of said real-time facial motion expression segments by weighted value to at least one of said expression segments of said Low Resolution Index facial expressions, said expressions being closely similar, and
(3) combining the motions of said segments in the Model Index to form a unique model expressions for each of said shot expressions;

G) creating real-time Computer Model expressions by:
   (1) moving points on said Computer Model Neutral Face through time according to the motions of each facial expression in said shot, and H) moving said Computer Model or said Robotic Face by moving said Nodal Points of said Computer Model or said positional controllers in real time according to specific motions of said Nodal Points on said Model Face.

2. The process of claim 1 in which said High Resolution Capture System is implemented by a plurality of High Density Markers, the face of a human actor, a plane of reference, at least two cameras and computer processing equipment and comprising the steps of:

A) placing said High Density Markers on said face,

B) recording a plurality of expressions on said face with said at least two cameras to produce a High Resolution Index, C) using said computer processors, processing said High Resolution Index to resolve the positions of said High Density Markers in three-dimension, and D) using said computer processors, mathematically scaled, translating and rotating each of said expressions to a common scale and normal to said given plane of reference.

3. The process of claim 1 in which said Low Resolution Capture System is implemented with two digital cameras, the face of a human actor, a plurality of Low Density Markers and computer processing equipment and comprising the steps of:

A) placing said Low Density Markers on said face,

B) using said cameras, recording facial expressions made on said face, said recorded expressions comprising a Low Resolution Index, C) processing said Low Resolution Index to resolve in three-dimensions the positions of said Low Density Markers, D) dividing said recorded face into logical segments, and E) mathematically scaling, translating and rotating each segment of each expression in said Low Resolution Index as needed to a common scale and in reference to a given plane.

* * * * *